US011454263B2

(12) United States Patent
Benoit et al.

(10) Patent No.: US 11,454,263 B2
(45) Date of Patent: Sep. 27, 2022

(54) SYSTEMS AND METHODS FOR A CONNECTOR

(71) Applicant: ILLINOIS TOOL WORKS INC., Glenview, IL (US)

(72) Inventors: Thomas A. Benoit, Bourbonnais, IL (US); Kileean E. Bell, Crete, IL (US)

(73) Assignee: Illinois Tool Works Inc., Glenview, IL (US)

( * ) Notice: Subject to any disclaimer, the term of this patent is extended or adjusted under 35 U.S.C. 154(b) by 424 days.

(21) Appl. No.: 16/714,365

(22) Filed: Dec. 13, 2019

(65) Prior Publication Data
US 2020/0217340 A1 Jul. 9, 2020

Related U.S. Application Data

(60) Provisional application No. 62/789,112, filed on Jan. 7, 2019.

(51) Int. Cl.
*F16B 5/00* (2006.01)
*F16B 5/06* (2006.01)
*F16B 21/08* (2006.01)

(52) U.S. Cl.
CPC .......... *F16B 5/0084* (2013.01); *F16B 5/0607* (2013.01); *F16B 21/086* (2013.01)

(58) Field of Classification Search
CPC .... F16B 5/0084; F16B 5/0607; F16B 21/086; F16B 5/0685; B60R 16/0215; H01R 13/40; H01R 13/502; H01R 13/627; H01R 13/629
See application file for complete search history.

(56) References Cited

U.S. PATENT DOCUMENTS

| | | | | |
|---|---|---|---|---|
| 3,490,300 A | * | 1/1970 | Toma | F16B 5/126 24/292 |
| 4,708,895 A | * | 11/1987 | Mizusawa | F16B 21/088 24/581.1 |
| 5,242,051 A | * | 9/1993 | Murphy | H05K 13/0084 24/615 |
| 5,662,375 A | * | 9/1997 | Adams | B60N 3/026 248/222.12 |
| 5,956,821 A | * | 9/1999 | Kurek, III | F16B 21/086 24/297 |
| 6,752,950 B2 | * | 6/2004 | Clarke | F16B 19/008 264/328.8 |
| 7,549,829 B2 | * | 6/2009 | Okada | F16B 5/065 24/453 |
| 8,943,655 B2 | * | 2/2015 | Kabeya | F16B 5/0657 24/453 |
| 9,121,426 B2 | * | 9/2015 | Jagoda | F16B 2/22 |
| 9,771,963 B2 | * | 9/2017 | Lepper | F16B 21/086 |
| 9,982,694 B2 | | 5/2018 | Scroggie et al. | |
| 10,519,992 B2 | * | 12/2019 | Santillan Gutierrez | F16B 2/22 |

(Continued)

*Primary Examiner* — David M Upchurch
(74) *Attorney, Agent, or Firm* — Quarles & Brady LLP

(57) ABSTRACT

A connector is provided. The connector includes a post defining a first side, a second side, and a first end. The connector further includes a stationary wing formed on the first side of the post and extending away from the first side of the post. The stationary wing is inflexible relative to the post. The connector further includes a flexible wing attached to the second side of the post adjacent to the first end and extending away from second side of the post. The flexible wing is configured to flex relative to the post.

18 Claims, 5 Drawing Sheets

(56) References Cited

U.S. PATENT DOCUMENTS

| | | | |
|---|---|---|---|
| 2009/0178249 A1* | 7/2009 | Jalbert | F16B 35/06 403/14 |
| 2012/0174345 A1* | 7/2012 | Scroggie | F16B 5/123 24/297 |
| 2015/0252826 A1* | 9/2015 | Cooley | F16B 2/20 24/499 |
| 2018/0128299 A1* | 5/2018 | Katabira | F16B 13/0833 |
| 2018/0187798 A1* | 7/2018 | Kanie | B60R 16/08 |

\* cited by examiner

US 11,454,263 B2

SYSTEMS AND METHODS FOR A CONNECTOR

CROSS-REFERENCES TO RELATED APPLICATIONS

The present application is based on and claims priority to U.S. Provisional Patent Application No. 62/789,112, filed on Jan. 7, 2019. The entire disclosure of which is incorporated herein by reference in its entirety.

STATEMENT REGARDING FEDERALLY SPONSORED RESEARCH

Not Applicable.

BACKGROUND

Generally, mechanically-based connectors are used to provide a connection to a component (e.g., plates, panels, conduits, etc.).

BRIEF SUMMARY

In one aspect, the present disclosure provides a connector including a post that defines a first side, a second side, and a first end. The connector further includes a stationary wing formed on the first side of the post and extending away from the first side of the post. The stationary wing is inflexible relative to the post. The connector further includes a flexible wing attached to the second side of the post adjacent to the first end and extending away from second side of the post. The flexible wing is configured to flex relative to the post.

In one aspect, the present disclosure provides connector including a post defining a first side, a second side, and a first end. The connector further includes a stationary wing formed on the first side of the post and extending away from the first side of the post. The stationary wing is inflexible relative to the post. The connector further includes a flexible wing attached to the second side of the post adjacent to the first end and extending away from second side of the post. A gap is formed between at least a portion of the flexible wing and the second side of the post to enable the flexible wing to flex relative to the post.

In one aspect, the present disclosure provides a connector assembly including a component having a mounting surface. The connector assembly includes a connector having a post defining a first side, a second side, and a first end. The connector further includes a stationary wing formed on the first side of the post and extending away from the first side of the post, and a flexible wing attached to the second side of the post adjacent to the first end and extending away from second side of the post. The stationary wing is inflexible relative to the post and the flexible wing is flexible relative to the post. The flexible wing is configured to upon insertion of the connector into the mounting surface of the component, flex toward the second side of the post and then away from the second side of the post to retain a connection between the connector and the component.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Conventional connectors (e.g., push-through connectors) may include two flexible wings or clips that are configured to receive and connect a component to the connector. In one non-limiting example, a conventional connector may include a W-shaped clip with two sides that flex relative to one another to facilitate the receipt and connection of a component to the connector. In some applications, a force may be applied to the connector at a distance away from the connection point(s) between the component and the connector, which generates a moment that may act on one of the flexible wings (depending on the direction of the force). This moment acting on one of the flexible wings may result in the flexible wing, or another portion of the connector, failing (e.g., breaking).

In general, the present disclosure overcomes these deficiencies in conventional connectors by providing a connector that includes a stationary wing and a single flexible wing. The stationary wing may be attached to a solid, thicker post and the flexible wing may extend from the post. The post and stationary wing provide more support to the connector and may absorb a load created by a moment applied to the connector. For example, the single flexible wing may transfer a load applied thereto to the post where the stationary wing is attached. In some instances, the connector may be arranged such that moments applied to the connector are loaded on the stationary wing and the post, where the connector is thicker and strongest. In this way, for example, the connector of the present disclosure may be more robust than conventional connectors (e.g., able to handle higher loads) and may provide a prolonged component life.

Figure 1:
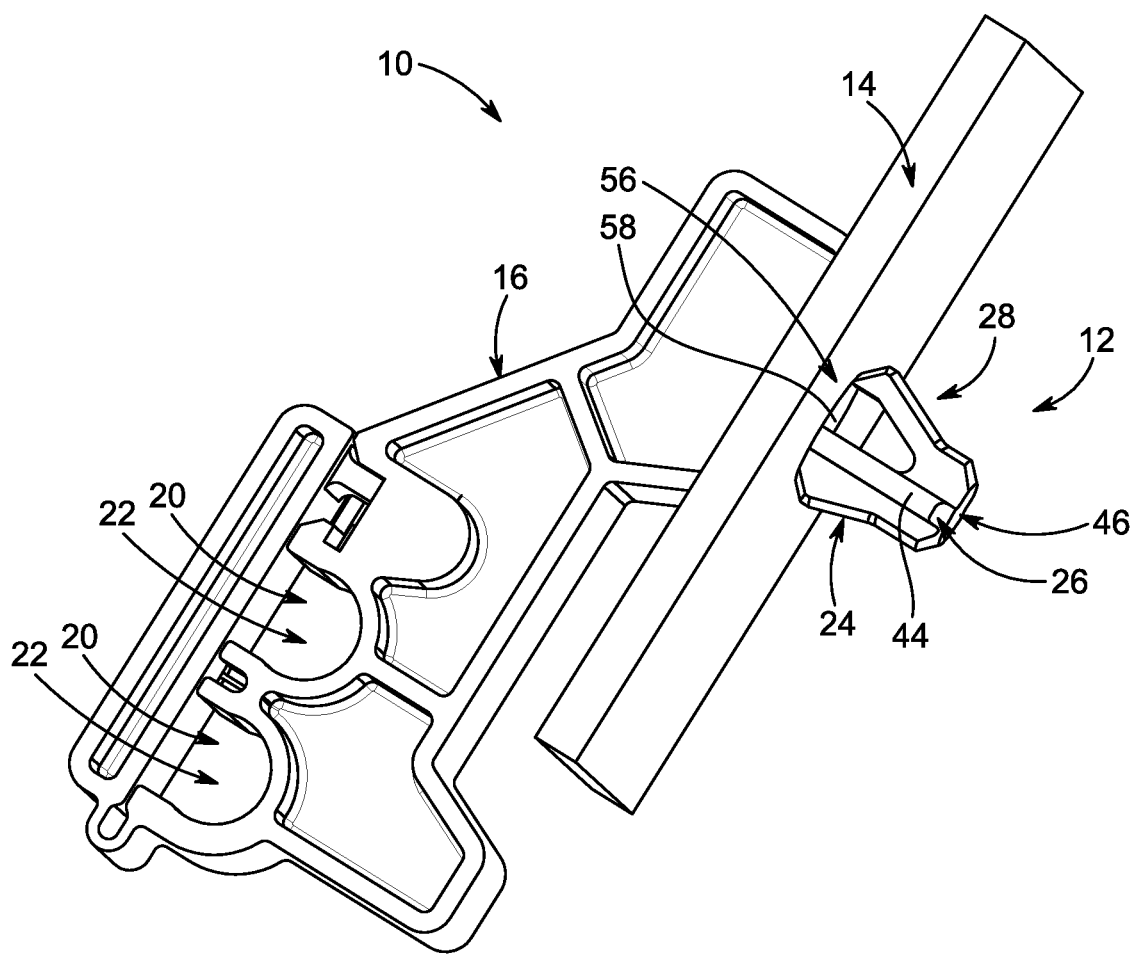
FIG. 1 is a bottom, left, front isometric view of a connector assembly according to the present disclosure.
Figure 2:
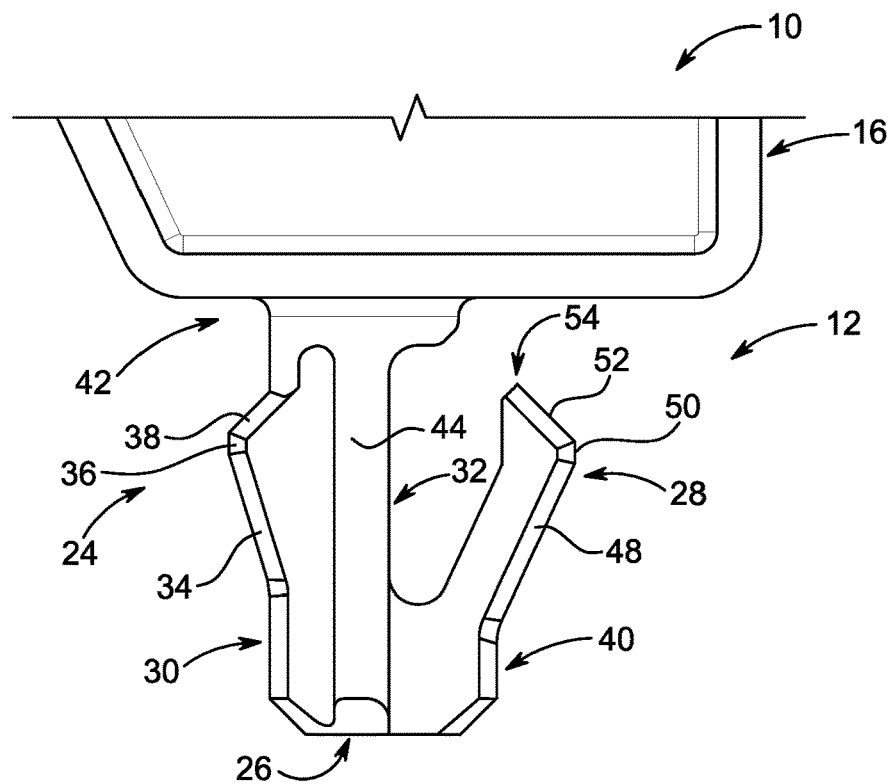
FIG. 2 is a left side view of a connector of the connector assembly of FIG. 1.
Figure 3:
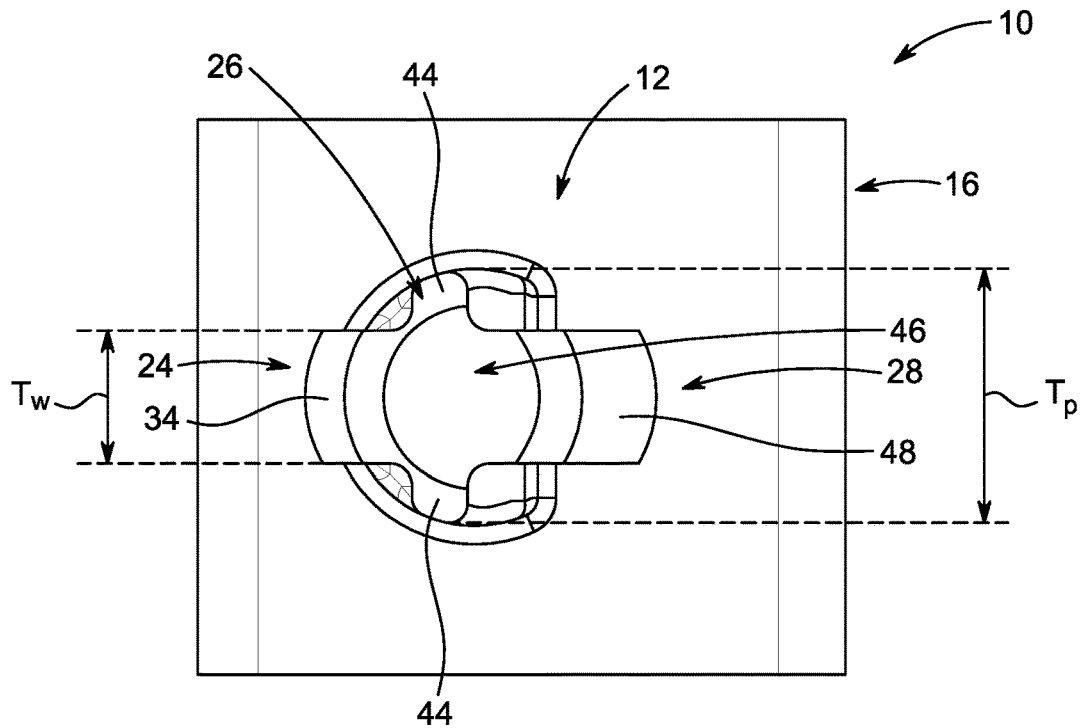
FIG. 3 is a partial bottom plan view of the connector of the connector assembly of FIG. 1.
Figure 4:
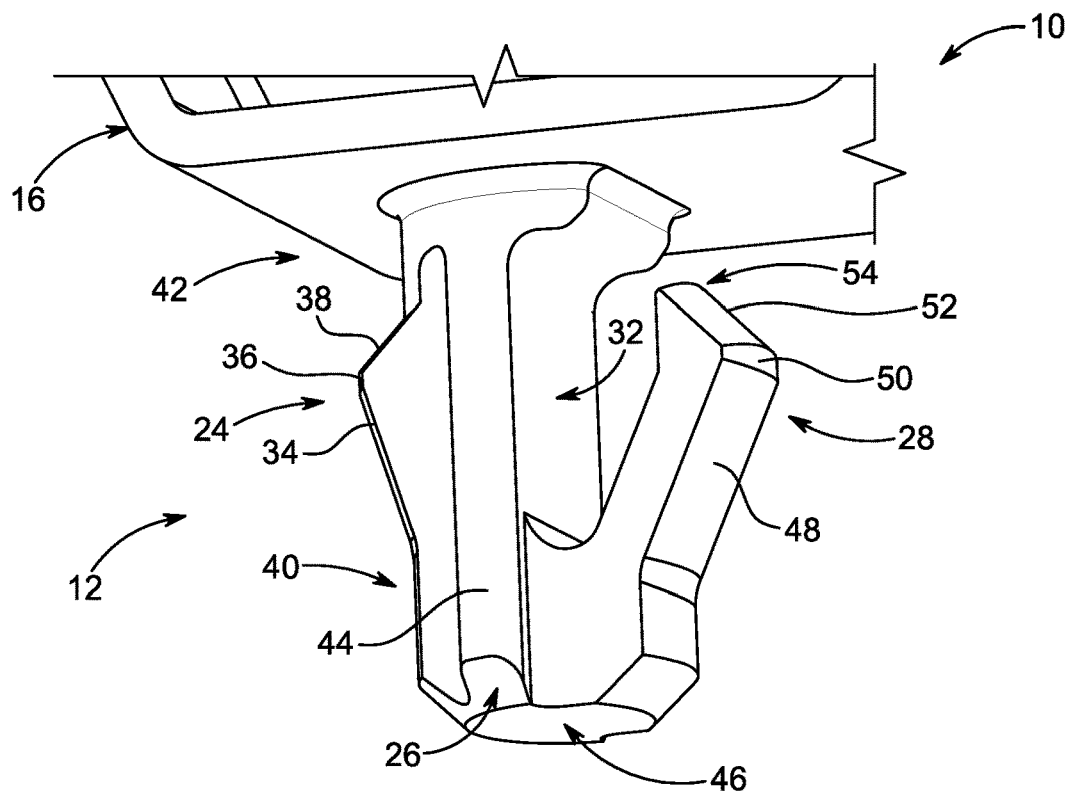
FIG. 4 is a partial top, left, front isometric view of the connector of the connector assembly of FIG. 1.
Figure 5:
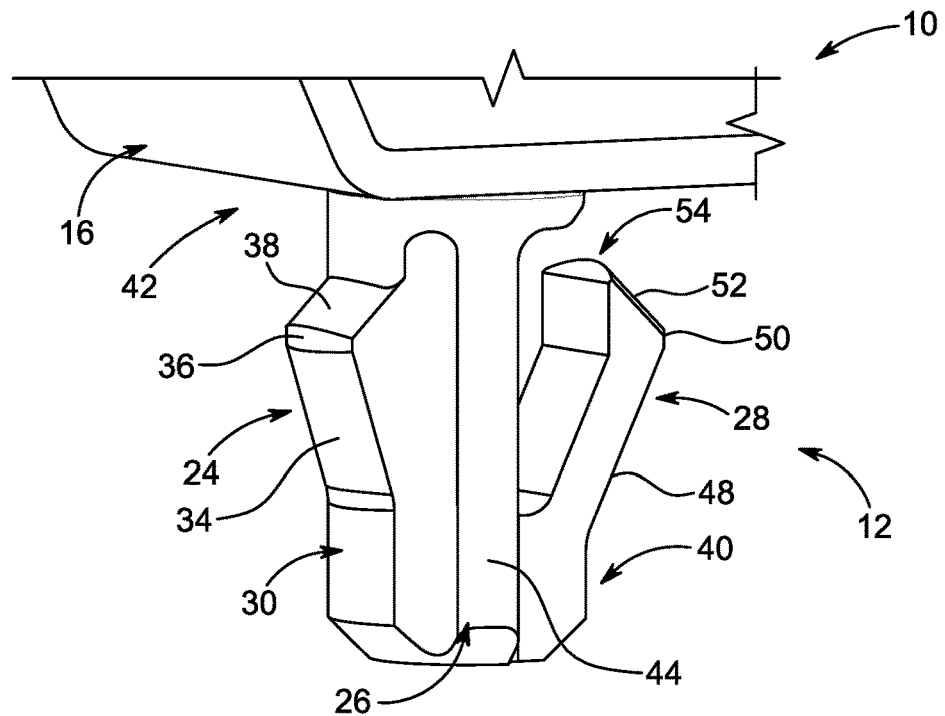
FIG. 5 is a partial bottom, left, back isometric view of the connector assembly of FIG. 1.

FIG. 1 illustrates a connector assembly 10 according to the present disclosure. In the illustrated embodiment, the connector assembly 10 includes a connector 12 and a component 14 configured to connect to the connector 12. In some embodiments, the component 14 may be a component of a vehicle (e.g., a plate, a wall, a panel, etc.). In some embodiments, the connector 12 may be configured as a routing clip on a vehicle that may be used to route, for example, wires, cables, pipes, and/or tubes. In general, the connector 12 may be utilized with any connector or fastener system.

In the illustrated embodiment, the connector 12 may include a body portion 16 attached thereto. In some embodiments, for example, the body portion 16 may include routing features 20 configured to facilitate the routing of elements on a vehicle. In the illustrated embodiment, the routing features 20 are in the form of routing apertures 22 that extend through the body portion 16 and facilitate the receipt of one or more elements of the vehicle. In other embodiments, the routing features 20 may be in the form of clips, tubes, or another structure through which components may be routed and that are attached to or formed integrally with the connector 12.

The connector 12 may be attached to the body portion 16 and extend therefrom. In some embodiments, the connector 12 and the body portion 16 may be integrally formed as a unitary component. In some embodiments, the connector 12 may be removably coupled to the body portion 16.

With reference to FIGS. 2-5, in the illustrated embodiment, the connector 12 includes a stationary wing 24, a post 26, and a flexible wing 28. The stationary wing 24 may be attached to and extend from a first side 30 of the post 26, and the flexible wing 28 may be attached to and extend from a second side 32 of the post 26 opposite the stationary wing 24.

In the illustrated embodiment, the stationary wing 24 may be solidly attached to the post 26 (e.g., solid material extends between the stationary wing 24 and the post 26 with no gaps or cavities). For example, the stationary wing 24 may be formed on, attached to, or integrally formed with the first side 30 the post 26, such that the stationary wing 24 may not move or flex relative to the post 26. In other words, the stationary wing 24 is inflexible relative to the post 26.

In the illustrated embodiment, the stationary wing 24 includes a first stationary ramped surface 34, a stationary ramp peak 36, and a second stationary ramped surface 38. In the illustrated embodiment, the first stationary ramped surface 34 may be angled in a direction away from the post 26. The first stationary ramped surface 34 may extend longitudinally along the first side 30 of the post 26 from a point between a first end 40 of the post 26 and a second end 42 of the post 26 to the stationary ramp peak 36. The stationary ramp peak 36 may define a greatest distance between the stationary wing 24 and the first side 30 of the post 26. In the illustrated embodiment, the second stationary ramped surface 38 may be angled in a direction toward the post 26. The second stationary ramped surface 38 may extend longitudinally along the first side 30 of the post 26 from the stationary ramp peak 36 to a point between the stationary ramp peak 36 and the second end 42 of the post 26.

In the illustrated embodiment, the post 26 may include a pair of post protrusions 44 extending in opposing directions laterally away from a central hub 46 of the post 26. The post protrusions 44 may extend in opposing directions away from one another that are generally perpendicular to the direction in which the stationary wing 24 and the flexible wing 28 extend away from the post 26. In this way, for example, the post 26 may define a lateral thickness $T_P$ that is greater than a lateral thickness $T_W$ defined by the stationary wing 24 and the flexible wing 28 (see, e.g., FIG. 3). This increased lateral thickness defined by the post 26, in combination with the stationary wing 24 being inflexibly attached thereto, may provide increased strength to the connector 12, when compared with conventional connectors. In the illustrated embodiment, the post protrusions 44 may define a generally rounded profile with a portion of the post protrusions 44 arranged nearer to the flexible wing 28 defining a greatest lateral extension away from the central hub 46. In some embodiments, the post protrusions 44 may define another profile (e.g., arcuate, rectangular, triangular, etc.).

In the illustrated embodiment, the flexible wing 28 includes a first flexible ramped surface 48, a flexible ramp peak 50, and a second flexible ramped surface 52. In the illustrated embodiment, the first flexible ramped surface 48 may be angled in a direction away from the second side 32 of the post 26. The first flexible ramped surface 48 may extend longitudinally from the first end 40 of the post 26 to the flexible ramp peak 50. The flexible ramp peak 50 may define a greatest distance between the flexible wing 28 and the second side 32 of the post 26. In the illustrated embodiment, the second flexible ramped surface 52 may be angled in a direction toward the second side 32 of the post 26. The second flexible ramped surface 52 may extend longitudinally from the flexible ramp peak 50 to a tip 54 of the flexible wing 28.

In the illustrated embodiment, the flexible wing 28 may be attached to the second side 32 of the post 26 adjacent to the first end 40 thereof, and the tip 54 of the flexible wing 28 may be arranged remotely from (i.e., not attached to) the second side 32 of the post 26. In some embodiments, the flexible wing 28 may be integrally formed with the post 26 and the stationary wing 24. In general, a gap, or lack of material, may exist along a portion of the flexible wing 28 between the second side 32 of the post 26 and the flexible wing 28. For example, the flexible wing 28 and the post 26 may form a generally V-shaped arrangement, and at least a portion of the flexible wing 28 may be arranged in a free-floating arrangement (i.e., not rigidly attached to the second side 32, or pivotally attached to the post 26) relative to the second side 32 of the post 26. Due to the lack of material between the flexible wing 28 and the post 26 (except for the attachment therebetween at the first end 40 of the post 26), at least a portion of the flexible wing 28 may be capable of flexing relative to the post 26. For example, the flexible wing 28 may be configured to flex in a direction either toward the post 26 or away from the post 26 (e.g., left to right from the perspective of FIG. 2).

With reference to FIGS. 1-7, the connector 12 may be configured to receive and connect to the component 14. In general, the component 14 may include a aperture, a slot, or another feature that the connector 12 may be inserted through. In the illustrated embodiment, the component 14 may include a mounting surface 56 extending through the component 14 to define a mounting aperture 58 (see, e.g., FIG. 1). To assemble the component 14 to the connector 12, the first end 40 of the post 26 may be may be inserted through the mounting aperture 58, such that a portion of the mounting surface 56 (e.g., an upper edge of the mounting aperture 58) engages the first stationary ramped surface 34 and the first flexible ramped surface 48. In general, the mounting aperture 58 may be designed with a diameter that is smaller than a distance between the stationary ramp peak 36 and the flexible ramp peak 50. Due to the smaller diameter of the mounting aperture 58 and the inflexibility of the stationary wing 24 relative to the post 26, the flexible wing 28 may be forced to flex inward in a direction toward the post 26 as the connector 12 is further inserted into the mounting aperture 58. This allows the mounting surface 56 of the component 14 to continue to slide along the first stationary ramped surface 34 and the first flexible ramped surface 48.

The flexible wing 28 will continue to flex inward in a direction toward the post 26 until the mounting surface 56 passes both the stationary ramp peak 36 and the flexible ramp peak 50. Once the mounting surface 56 passes both the stationary ramp peak 36 and the flexible ramp peak 50, the flexible wing 28 may snap back or flex outward in a direction away from the post 26. A portion of the mounting surface 56 (e.g., a lower edge of the mounting aperture 58) may then engage the second stationary ramped surface 38 and the second flexible ramped surface 52. With the portion of the mounting surface 56 in engagement with the second stationary ramped surface 38 and the second flexible ramped surface 52, the angled design of the second stationary ramped surface 38 and the second flexible ramped surface 52 may bias the component 14 in a direction toward body portion 16 of the connector 12 (e.g., upward from the perspective of FIG. 6, or to the left from the perspective of FIG. 7). In this way, for example, the stationary wing 24 and the flexible wing 28 may maintain the connection between the component 14 and the connector 12 and substantially inhibit the connector 12 from being removed from the component 14.

To remove the component 14 from the connector 12, for example, a user may be required to manually bias the flexible wing 28 inward toward to the post 26 to enable the connector 12 to be removed through the mounting aperture 58.

Figure 6:
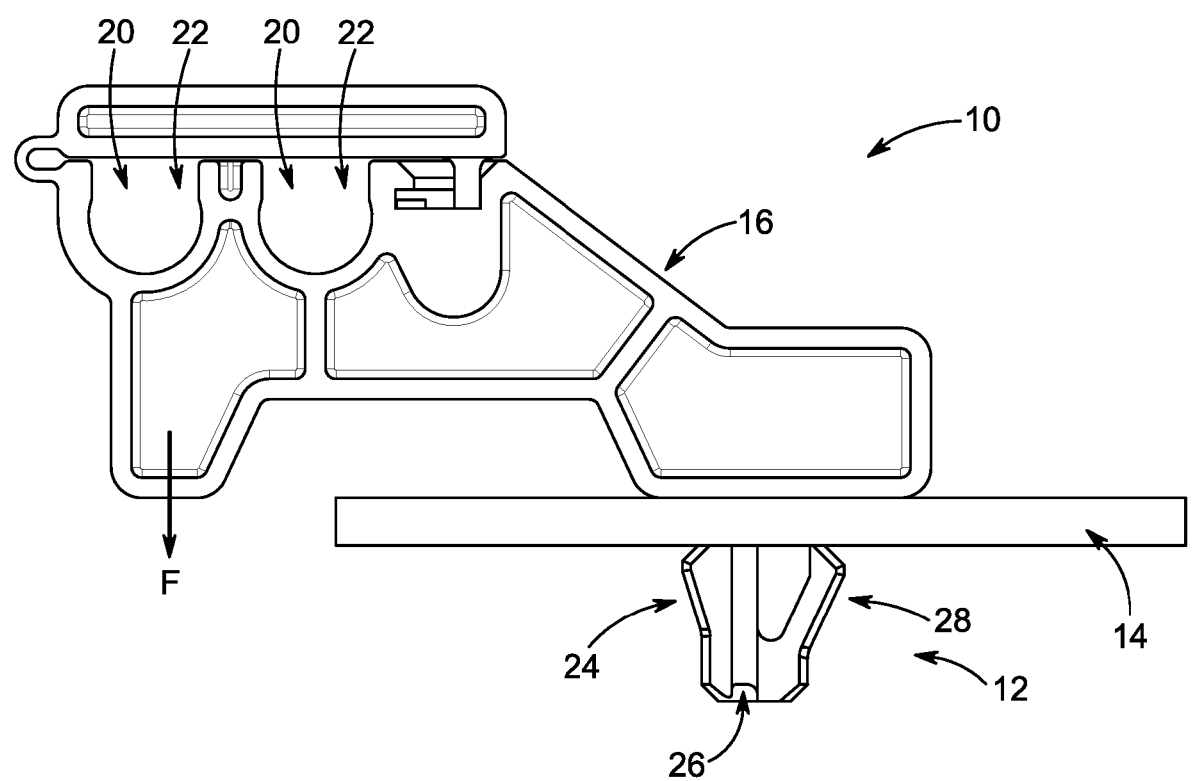
FIG. 6 is a left side view of the connector assembly of FIG. 1 in a horizontal orientation.

FIG. 6 illustrates one non-limiting example of the connector assembly 10 oriented horizontally. In some applications, the connector assembly 10 may be horizontally oriented and a force F may be applied to the body portion 16 (e.g., due to the elements of a vehicle routed through the routing features 20). The force F may be applied at a distance away from the connection between the connector 12 and the component 14 and, therefore, a moment may be generated on the connector 12. In the illustrated non-limiting example, the moment may be generated on the connector 12 in a counterclockwise direction. The connector 12 is designed such that the generated moment is loaded directly onto the stationary wing 24 and the post 26 attached thereto. As described herein, the post 26 may defined a greatest lateral thickness of the connector 12 and the stationary wing 24 may be inflexible relative to the post 26, due to the solid attachment thereto. Thus, the generated moment may be loaded onto the strongest portion of the connector 12, rather than the flexible wing 28, which allows the connector 12 to withstand higher loads compared to conventional connectors.

Figure 7:
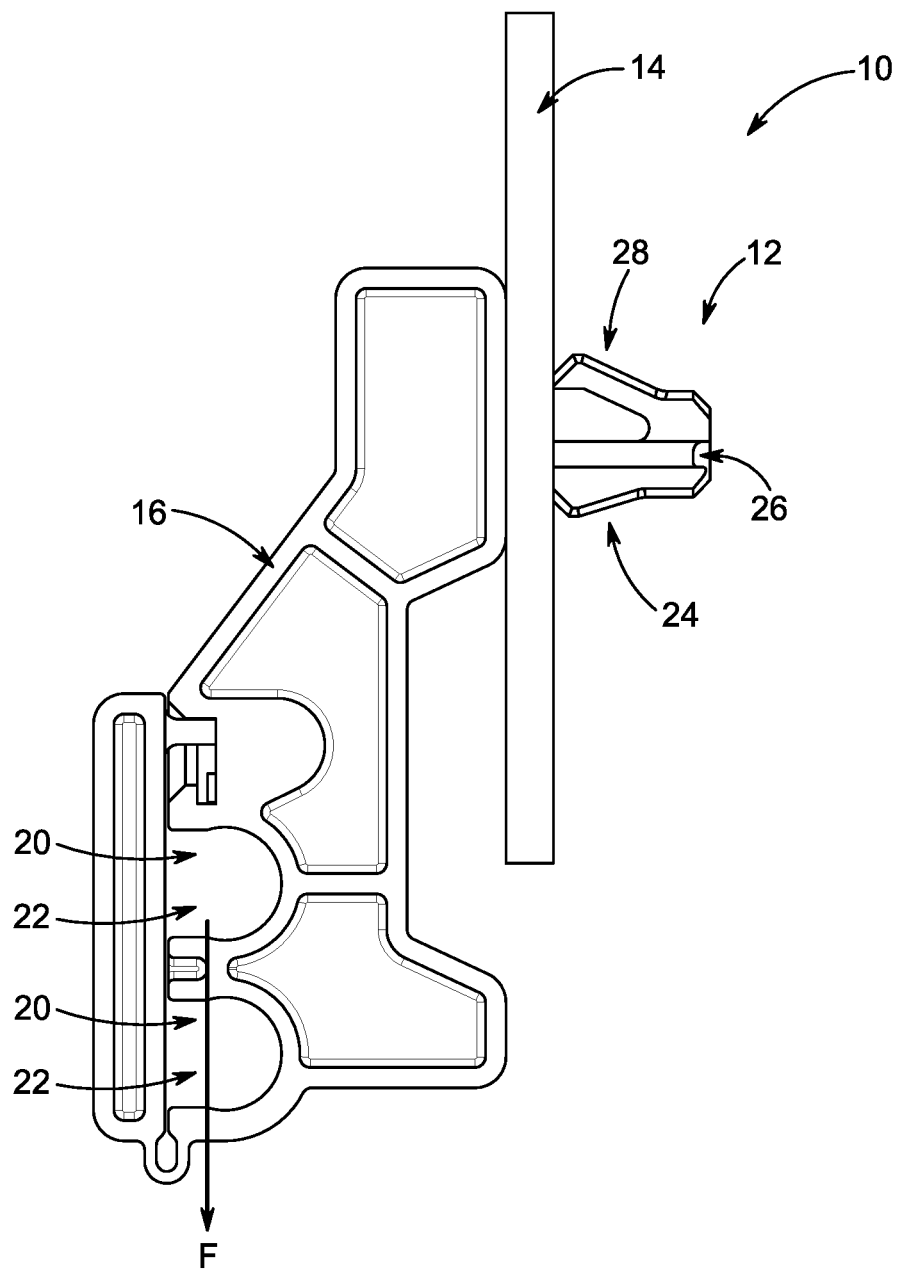
FIG. 7 is a left side view of the connector assembly of FIG. 1 in a vertical orientation.

FIG. 7 illustrates one non-limiting example of the connector assembly 10 oriented vertically. In some application, the connector assembly 10 may be vertically oriented and a force F may be applied to the body portion 16 (e.g., due to the elements routed through the routing features 20). The force F may be applied at a distance away from the connection between the connector 12 and the component 14 and, therefore, a moment may be generated on the connector 12. In the illustrated non-limiting example, the moment may be generated on the connector 12 in a counterclockwise direction. Similar to the horizontal orientation, the design of the connector 12 ensures that the load generated by the moment acts directly on the stationary wing 24 and the post 26 attached thereto, where the connector 12 is strongest.

In general, the connector 12 may define alternative orientations and arrangements in other applications. For example, the direction of the moment generated on the connector 12 may be known for a given application, and the connector 12 may be designed such that the moment acts on the stationary wing 24 and the post 26 attached there to.

While the invention herein is described in with reference to a connector designed to connect to a component, one skilled in the art will understand that the concepts herein may be utilized with respect to the connection or fastening of any two components. In some embodiments, the embodiments herein may be utilized with respect to a fastener or retainer system to facilitate the fastening or retention of one or more components. In a non-limiting example, the concepts of the present invention may be utilized with a push-through fastener, for example, the push-through fastener shown in U.S. Pat. No. 9,982,694 to Scroggie et al., entitled "Push Through Retainer Connection with Integrated Hinging Seal," and assigned to the assignee of the present application, the disclosure of which is hereby incorporated herein by reference in its entirety. Further, in a similar manner, the concepts of the present invention may be utilized with any two part fastener system.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A connector comprising:
a post defining a first side, a second side, and a first end;
a stationary wing formed on the first side of the post and extending away from the first side of the post, wherein the stationary wing is inflexible relative to the post, and wherein the stationary wing includes a first stationary ramped surface, a stationary ramp peak, and a second stationary ramped surface; and
a flexible wing attached to the second side of the post adjacent to the first end and extending away from second side of the post, wherein the flexible wing is configured to flex relative to the post.

2. The connector of claim 1, wherein the post and the stationary wing are integrally formed.

3. The connector of claim 1, wherein the post, the stationary wing, and the flexible wing are integrally formed.

4. The connector of claim 1, wherein the first stationary ramped surface is angled in a direction away from the first side of the post, and the second stationary ramped surface is angled in a direction toward the first side of the post.

5. The connector of claim 1, wherein the flexible wing includes a first flexible ramped surface, a flexible ramp peak, and a second flexible ramped surface.

6. The connector of claim 5, wherein the first flexible ramped surface is angled in a direction away from the second side of the post, and the second flexible ramped surface is angled in a direction toward the second side of the post.

7. The connector of claim 1, wherein the post defines a greatest lateral thickness relative to the stationary wing and the flexible wing.

8. The connector of claim 1, wherein the post includes one or more post protrusions extending away from a central hub.

9. The connector of claim 8, wherein the one or more post protrusions provide an increased lateral thickness of the post.

10. A connector comprising:
a post defining a first side, a second side, and a first end;
a stationary wing formed on the first side of the post and extending away from the first side of the post, wherein the stationary wing is inflexible relative to the post, wherein the stationary wing includes a first stationary ramped surface, a stationary ramp peak, and a second stationary ramped surface, and wherein the first stationary ramped surface is angled in a direction away from the first side of the post, and the second stationary ramped surface is angled in a direction toward the first side of the post; and
a flexible wing attached to the second side of the post adjacent to the first end and extending away from second side of the post, wherein a gap is formed between at least a portion of the flexible wing and the second side of the post to enable the flexible wing to flex relative to the post.

11. The connector of claim 10, wherein the flexible wing includes a first flexible ramped surface, a flexible ramp peak, and a second flexible ramped surface, and wherein the first flexible ramped surface is angled in a direction away from the second side of the post, and the second flexible ramped surface is angled in a direction toward the second side of the post.

12. The connector of claim 10, wherein the post includes one or more post protrusions extending away from a central hub.

13. The connector of claim 12, wherein the one or more post protrusions provide an increased lateral thickness of the post relative to the stationary wing and the flexible wing.

14. A connector assembly including a component having a mounting surface, the connector assembly comprising:
a connector including:
a post defining a first side, a second side, and a first end;
a stationary wing formed on the first side of the post and extending away from the first side of the post, wherein the stationary wing includes a first stationary ramped surface, a stationary ramp peak, and a second stationary ramped surface; and
a flexible wing attached to the second side of the post adjacent to the first end and extending away from second side of the post,
wherein the stationary wing is inflexible relative to the post and the flexible wing is flexible relative to the post, the flexible wing being configured to:
upon insertion of the connector into the mounting surface of the component, flex toward the second side of the post and then away from the second side of the post to retain a connection between the connector and the component.

15. The connector assembly of claim 14, wherein when a moment is generated on the connector, the moment acts on the stationary wing and the post of the connector.

16. The connector assembly of claim 14, wherein the first stationary ramped surface is angled in a direction away from the first side of the post, and the second stationary ramped surface is angled in a direction toward the first side of the post.

17. The connector assembly of claim 14, wherein the flexible wing includes a first flexible ramped surface, a flexible ramp peak, and a second flexible ramped surface, and wherein the first flexible ramped surface is angled in a direction away from the second side of the post, and the second flexible ramped surface is angled in a direction toward the second side of the post.

18. The connector assembly of claim 14, wherein the post defines a greatest lateral thickness relative to the stationary wing and the flexible wing.

* * * * *